Patented June 7, 1938

2,119,614

UNITED STATES PATENT OFFICE 2,119,614

PROCESS FOR PREPARING A USEFUL MILK SERUM OR WHEY PRODUCT

Byron H. Webb, Washington, D. C., and Guy A. Ramsdell, Arlington, Va.; dedicated to the free use of the People of the United States No Drawing. Application April 14, 1937,
Serial No. 136,818

4 Claims. (Cl. 99—57)

(Granted under the act of March 3, 1883, as amended April 30, 1928; 370 O. G. 757)

This application is made under the act approved March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the people of the United States to take effect on the granting of a patent to us.

This application describes a process which we have discovered for cheaply preserving serum of milk so that it may be subsequently used in various food products.

The serum is here considered to be that portion of milk which is left when the fat and casein are removed by acid or rennet coagulation, ultrafiltration or high speed centrifuging. It contains most of the milk sugar, the milk salts, and the non-acid coagulable protein of milk. The serum with which we have largely worked is known in the art as whey and is a by-product of cheese manufacturing, of which the following is a typical analysis:

| | Percent |
|---|---|
| Lactose | 5.0 |
| Ash | 0.6 |
| Protein | 1.2 |
| Water | 93.2 |

Wide variations in the composition of this milk serum occur with natural variations in the composition of normal milk.

Approximately half of the food value of milk is possessed by the serum solids. These solids have certain unique characteristics which we have utilized in the preparation of new food products. We have also found the serum solids of milk to be of value in established food products in place of milk solids or in some cases as a substitute for egg white.

An inexpensive method of preservation of the serum of milk is essential if this material is to be used in the various food products in which we find it of value. At present the serum of milk may be reduced to a soluble powder which is a satisfactory form for our purpose but very large quantities of material are necessary to economically operate a spray drying plant and reduction to the powdered form is more expensive than is our new method of preservation. The process which we have developed does not require such expensive equipment as a drying plant nor is it necessary to have large quantities of material available for processing.

The new process which we have discovered for preserving the serum solids of milk consists in adding sucrose to the serum or a modified form of the serum and subsequently condensing the mixture to a heavy syrup and finally crystallizing the lactose as small crystals. This concentrated milk serum contains sufficient sugar to preserve it for long periods of time at ordinary temperatures of storage.

A wide latitude in the composition of the milk serum mixture which we concentrate is permissible. The composition of the product will depend upon the use to which the concentrate is to be put. The normal serum may be condensed with the addition of sucrose alone. If additional serum proteins are desired this protein material may be added to the original mixture. Additional protein is obtained by heat coagulation and filtration of a portion of the serum. The coagulated protein thus obtained is homogenized, the fine suspension being added to a portion of the normal serum, thus increasing the protein but decreasing the lactose and salt content of the mixture.

Some of the products in which our concentrated serum solids are used also contain butterfat. In such cases it is convenient and economical to add butterfat to our concentrate. Butterfat can be preserved by this means without the expensive steps of churning it to butter and of storing it either as butter or cream. Butterfat is most economically added to our product as whey cream but it may also be secured from normal cream or as sweet butter homogenized into the serum solids before concentration. The form of fat which is used will depend upon the material available and whether or not casein is permissible in the final product.

Examples of our process for the preservation of the serum of milk follow. These examples serve only as illustrations of our process and wide variations from the figures given are permissible.

We prepare in the following manner a sweetened serum concentrate in which the normal ratio of serum solids is maintained:

Milk serum, otherwise known in the art as whey, is obtained from fresh milk by coagulating the casein with rennet and separating the serum from the curd. The casein may be removed also by other means. We pass the resulting serum through a separator to remove any residual fat, pasteurize the fat free serum at 62° C. for 30 minutes, then add 13.6 pounds of sucrose to every 200 pounds of serum, and finally condense the sweetened serum under vacuum to 75 percent total solid content. During condensing the temperature is maintained sufficiently low to prevent coagulation of the albumin, preferably 50° C. or below. The sweetened condensed product is transferred to a suitable container provided with a mechanical stirrer and water jacket so that the temperature can be brought to 30–35° C. as rapidly as possible by running cold water through the jacket. The product is stirred while cooling until crystallization of the lactose is complete. Very fine lactose crystals result when using this procedure. Small crystals are desirable to give a smooth-bodied product. The material is placed in suitable containers for storage. To prevent mold growth the containers are either sealed or the surface of the condensed serum covered with paraffin.

The proportions of 200 pounds of serum to 13.6 pounds of sugar (sucrose) and the condensing to 75 percent total solids yields a product containing a sugar in water ratio of 60 percent, which, we find, is adequate for preservation. This will represent a 1 to 1 ratio of serum solids to sucrose.

A satisfactory product can be obtained also by condensing to a lesser or greater total solid content than 75 percent and using also a ratio of serum solids to sucrose differing from the above 1 to 1 ratio, provided the final concentrated product contains a sugar in water ratio of at least 60 percent. We have prepared sweetened condensed serum suitable for use in food products in which the total solids varied between 68 percent and 85 percent.

We find also that a satisfactory sweetened condensed serum can be obtained by condensing the milk serum to approximately 18° Baumé before adding the sugar. The sugar may also be added immediately after the serum has been condensed to the desired final concentration which is approximately 37.5 percent serum solids.

We have made products in which the normal ratio of the various serum solids to each other is not maintained. The following example illustrates the process we use for increasing the protein content of our sweetened condensed serum.

We first acidify 200 pounds of milk serum with 5 percent hydrochloric acid to a pH of 4.6, heat to 80–90° C. to coagulate the heat coagulable protein, allow to settle, syphon off the supernate liquid and homogenize the residue containing up to 15 percent solids. We then add this residue of coagulated protein and serum to 200 pounds of milk serum and 18 pounds of sugar. This mixture is then condensed, cooled and packaged in a manner similar to that described in the processing of the above sweetened condensed milk serum. Another variation in this procedure is to add heat coagulated albumin obtained from milk serum in which more of the water and soluble constituents of the serum have been removed by passage through a filter press.

When butterfat is desired in our serum products it is added in the same manner as the additional serum protein. We add any amount of butterfat up to 20 pounds per 200 pounds of serum as described in the above example.

Having thus described our invention, what we claim for Letters Patent is:

We claim:

1. A process for treating the serum solids of milk, consisting of condensing milk serum under vacuum, the while adding sufficient sucrose, thereby producing a concentration of substantially 60 percent sugar in water in the finished product, and continuing the said condensation until a mixture is obtained of not more than 32 percent water and at least 68 percent total solids, and subsequently cooling and stirring the concentrate to crystallize the lactose as small crystals.

2. A process for treating the serum solids of milk, consisting of subjecting a portion of the serum to the action of heat, removing the precipitated protein, homogenizing a mixture of the coagulated protein and another portion of the serum, thence condensing said mixture under vacuum, the while adding sufficient sucrose, thereby producing a concentration of substantially 60 percent sugar in water in the finished product, and continuing the said condensation until a mixture is obtained of not more than 32 percent water and at least 68 percent total solids, and subsequently cooling and stirring the concentrate to crystallize the lactose as small crystals.

3. A process for treating the serum solids of milk, consisting of adding a quantity of butterfat to milk serum, homogenizing the mixture, condensing it under vacuum, adding sufficient sucrose, thereby producing a concentration of substantially 60 percent sugar in water in the finished product, and continuing the said condensation until a mixture is obtained of not more than 32 percent water and at least 68 percent total solids, and subsequently cooling and stirring the concentrate to crystallize the lactose as small crystals.

4. A process for treating the serum solids of milk, consisting of subjecting a portion of the serum to the action of heat, removing the precipitated protein, thence homogenizing a mixture of the coagulated protein and a quantity of butterfat with another portion of the serum, thence condensing said mixture under vacuum, the while adding sufficient sucrose, thereby producing a concentration of substantially 60 percent sugar in water in the finished product, and continuing the said condensation until a mixture is obtained of not more than 32 percent water and at least 68 percent total solids, and subsequently cooling and stirring the concentrate to crystallize the lactose as small crystals.

BYRON H. WEBB.
GUY A. RAMSDELL.